United States Patent [19]

Hellwig et al.

[11] Patent Number: 5,065,129
[45] Date of Patent: Nov. 12, 1991

[54] PRESSURE SENSOR AND METHOD FOR CALIBRATING PRESSURE SENSORS

[75] Inventors: Reimar Hellwig, Ober-Ramstadt; Ralf Waegner, Trebur, both of Fed. Rep. of Germany

[73] Assignee: Hottinger Baldwin Measurements, Inc., Marlboro, Mass.

[21] Appl. No.: 557,143

[22] Filed: Jul. 23, 1990

[30] Foreign Application Priority Data

Jul. 22, 1989 [EP] European Pat. Off. ........ 89113539.4

[51] Int. Cl.[5] ............................................... G01L 1/22
[52] U.S. Cl. ..................................... 338/4; 73/862.65; 73/720; 73/726; 29/621.1; 338/36
[58] Field of Search ............... 338/4, 47, 2, 5, 36; 73/862.65, 720, 726, 760, 763, 774; 29/621.1; 177/211

[56] References Cited

U.S. PATENT DOCUMENTS

| | | | |
|---|---|---|---|
| 2,951,223 | 8/1960 | Li | 338/4 |
| 3,035,240 | 5/1962 | Starr | 338/4 |
| 3,712,123 | 1/1973 | Laimins | 73/862.65 |
| 3,764,950 | 10/1973 | Wallia | 338/4 X |
| 3,866,157 | 2/1975 | Birkholz | 338/5 |
| 4,017,819 | 4/1977 | Pien | 338/4 |
| 4,133,100 | 1/1979 | Myhre | 29/621.1 |
| 4,376,929 | 3/1983 | Myhre | 338/4 |
| 4,589,291 | 5/1986 | Sander | 73/862.65 |

FOREIGN PATENT DOCUMENTS 2263901 7/1973 Fed. Rep. of Germany.

Primary Examiner—Marvin M. Lateef
Attorney, Agent, or Firm—W. G. Fasse

[57] ABSTRACT

A precision pressure sensor in the form of a load cell has a mounting ring closed at one end by an end wall which has axially outwardly facing dead-end holes therein to form sensor beams each having an axially outwardly facing plane surface to which strain gages are bonded. The dead-end holes have bottoms forming sensor membranes. Opposite the closed end the mounting ring encloses a cavity forming a sensor space which is closed by a closure plug that simultaneously has a bore for admitting fluid under pressure to be measured into the sensor space. A ring groove in the end wall has approximately radially sloping surfaces which together with the dead-end holes determine the minimum cross-section of the measuring beams. The ring groove also determines the minimum thickness of the sensor membranes.

24 Claims, 4 Drawing Sheets

PRESSURE SENSOR AND METHOD FOR CALIBRATING PRESSURE SENSORS

FIELD OF THE INVENTION

The invention relates to a pressure sensor with a pressure-sensitive membrane having a thickened radially inner area and a thickened radially outer area. Several measuring sensor beams with strain gages cooperate with the membrane between the inner and outer areas.

BACKGROUND INFORMATION

A pressure sensor of the type mentioned above is known from German Patent Publication (DE-OS) 2,263,901 (Andersson). The known pressure sensor has a pressure-sensitive membrane with a thickened inner area and a thickened outer area. Reaching between the inner area and the outer area are ridge-shaped upright measuring beams of constant cross-section. These measuring beams are rigidly secured to the membrane and loaded by shear stress. The measuring beams are provided with strain gages which measure the deformations. Although such pressure sensors exhibit greater sensitivity than pressure sensors with membranes without measuring beams, the attainable linearity is limited in pressure sensors as disclosed by Andersson. German Patent Publication (DE-OS) 2,263,901 contains explanations indicating that measuring transducers that function with measuring beams subject to bending stress are inferior to transducers in which the measuring beams are subject to shear stress. U.S. Pat. No. 3,712,123 (Laimins) discloses a compound plate strain gage transducer having a low profile and capable of measuring tension or compression loads. In the Laimins transducer a diaphragm (16) is formed in the compound plate, e.g. by four closed-end holes (12, 13, 14, 15) spaced by 90° from one another to form ribs (23, 24, 25, 26) as sensor beams carrying strain gages (19, 20, 21, 22). The ribs or beams have sloping surfaces (10, 11) to provide a rib thickness which changes in the radial direction to have a minimum thickness about halfway between a rim (7) and a hub (8). The closed-end holes serve two purposes. First, the holes determine with their diameter the size of the ribs and thus the mechanical strength of the transducer. Second, the holes determine with their depth the thickness of the sensitive portion of the membrane and thus the sensitivity of the transducer.

In the Laimins transducer the strain gages are applied to said sloping rib surfaces. This is undesirable because securing the strain gages in exact positions on sloping surfaces is difficult. The strain gages are secured by an adhesive and slipping of any individual strain gage as it is being applied to the sloping beam surface, is hard to avoid until the adhesive has cured. Thus, Laimins leaves room for improvement, especially with regard to avoiding special hold-down tools for the mounting of the strain gages in precise positions. U.S. Pat. Nos. 4,376,929 (Myhre) and 4,133,100 (Myhre) disclose a modified diaphragm for a load cell of the Laimins type, in which the plurality of dead-end holes has been replaced either by a single hole with two diametrically opposite lobes, or with intricate depressions, or with a large number of holes or depressions for controlling the stress distribution, the sensitivity and other transducer qualities including a mechanical amplification in the output signal generation. U.S. Pat. No. 4,133,100 relates especially to the manufacturing of such diaphragms by means of chemical etching. The precise placing of the strain gages is difficult.

U.S. Pat. No. 3,035,240 (Starr) discloses a diaphragm compression sensing load cell with a diaphragm having one or more sensor beams integrally formed with the diaphragm held in a spring element which in turn is mounted between two housing plates. The main purpose of Starr is to protect the strain gages from the working fluid and external effects. For this purpose the strain gages are to be mounted in end bores of the sensing beam. This type of mounting is also hard to accomplish with precision in practice.

OBJECTS OF THE INVENTION

In view of the foregoing, it is the aim of the invention to achieve the following objects singly or in combination:

to construct a pressure sensor of the type mentioned above which, in addition to high absolute accuracy, has a particularly good linearity;

to provide a load cell type pressure sensor having characteristics qualifying the load cell for use as a calibrating reference; and to provide a well defined surface area on the sensor beams of such a load cell for an easy, accurate, and consistently repeatable mounting of the strain gages to the sensor beams.

SUMMARY OF THE INVENTION

According to the invention a load cell for sensing compressions has sensor beams arranged in a cross on a membrane. The beams are constructed as bending beams whose cross-section varies along the beam length, whereby the area with the smallest cross-section lies between neighboring radially inner bending beam sections and radially outer beam sections.

A preferred pressure sensing load cell of the invention comprises a mounting ring having a central axis, an end wall closing one end of said mounting ring, said end wall having a plane surface facing in an axially outward direction, a plurality of dead-end holes in said plane surfaced end wall, said dead-end holes opening in said axially outward direction, sensor membrane means formed in said end wall by said dead-end holes, an axial central cavity in said mounting ring, said central cavity opening in a direction opposite said plurality of holes, substantially radially extending sensor beams formed between neighboring dead-end holes, each sensor beam having a plane axially outwardly facing beam surface extending perpendicularly to said central axis, strain gage means bonded to said axially outwardly facing plane beam surfaces of said sensor beams, each of said sensor beams having two approximately radially slope surface portions facing said central cavity opposite said plane beam surface, a closure plug for closing said central cavity to form a sensor space for holding fluid under pressure to be measured, and fluid conduit means for admitting fluid under pressure into said sensor space, whereby said approximately radially sloping surface portions of each sensor beam face into said sensor space.

Although the principle of the bending beam has been described as being inferior, it is used in the invention. Surprisingly, it has been shown that excellent measuring properties are obtained with the pressure sensor according to the invention. Excellent linearity is provided by the construction of the measuring beams as bending beams, and a cross-section tapering from both beam ends toward approximately the center of the bending beam. The cross-sectional beam dimensions can influence the deformation of the bending beams precisely. The cross-section can be adjusted conveniently by machining the height, measured from the surface of the membrane, and/or by changing the width of the bending bar. Thus, the bending beam cross-section can be adjusted conveniently by simple machining of the bending beam surfaces that face away from the membrane or the cross-section can be influenced by the shape of the lateral surfaces by changing the diameter of the dead-end holes in the end wall of the mounting ring.

In an advantageous further embodiment the beam cross-sections of the bending beams taper continuously from the inner area radially outwardly and from the outer mounting ring radially inwardly, but preferably leaving axially outwardly facing beam surfaces without a slant for the precise and easy mounting of the strain gages.

It is advantageous in terms of attainable accuracy to construct the measuring body, the membrane, and the bending beams in one piece, without connection regions, whereby undefined influences are avoided.

Manufacturing is substantially simplified if the dead-end holes in the end wall which is basically a disk-shaped measuring body, face axially and outwardly away from the membrane. These holes define the longitudinal sides of the bending beams. The dead-end holes form cylinder-shaped recesses which define, in addition to the sides of the bending beam, the inner and outer surface areas of the membrane proper. The hole depth of the dead-end holes defines the membrane thickness.

Particularly advantageous regarding the desired linearity, is an embodiment of the invention in which the axially inwardly facing end wall forming the membrane, has axially facing surfaces between the outer mounting ring and an inner area, formed by two contraposed conical frustums. Thus, the linearity properties and the accuracy, particularly for pressure sensors for small measuring ranges, can be influenced conveniently simply by machining these facing surfaces of the measuring body or end wall.

The convenient machining in fact applies to all axially facing surfaces if they face axially outwardly as do the bottoms of the dead-end holes or if they face axially inwardly into the cavity which forms a sensor space for admitting fluid under pressure to be measured.

Furthermore, an embodiment in which the ratio of the membrane thickness to the axial height of the bending beams is chosen in the range from ½ to 1/10, is advantageous with regard to the desired measuring properties; a ratio of approximately 1/6 is particularly advantageous for an improved sensitivity with a good mechanical stability.

Disturbing influences, such as may be caused by a torque applied for mounting the sensor to a support can be decoupled in an embodiment in which the pressure connection body or closure plug has a ring groove near the measuring body. Preferably, the ring groove extends nearly to the channel or duct for the pressure medium for isolating the sensor section with its mounting ring from the closure plug which also forms a mounting for the entire unit. The isolation keeps adverse influences from reaching the sensor section. Proper isolation is enhanced if the end section of the pressure connection body or closure plug is inserted into a cylindrical recess in the sensor section mounting ring to join the end section to the lateral inner surfaces of the recess. Such a connection or joint is stressed primarily only by shearing forces which do not negatively influence the measuring properties. The joint is preferably a weld joint.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
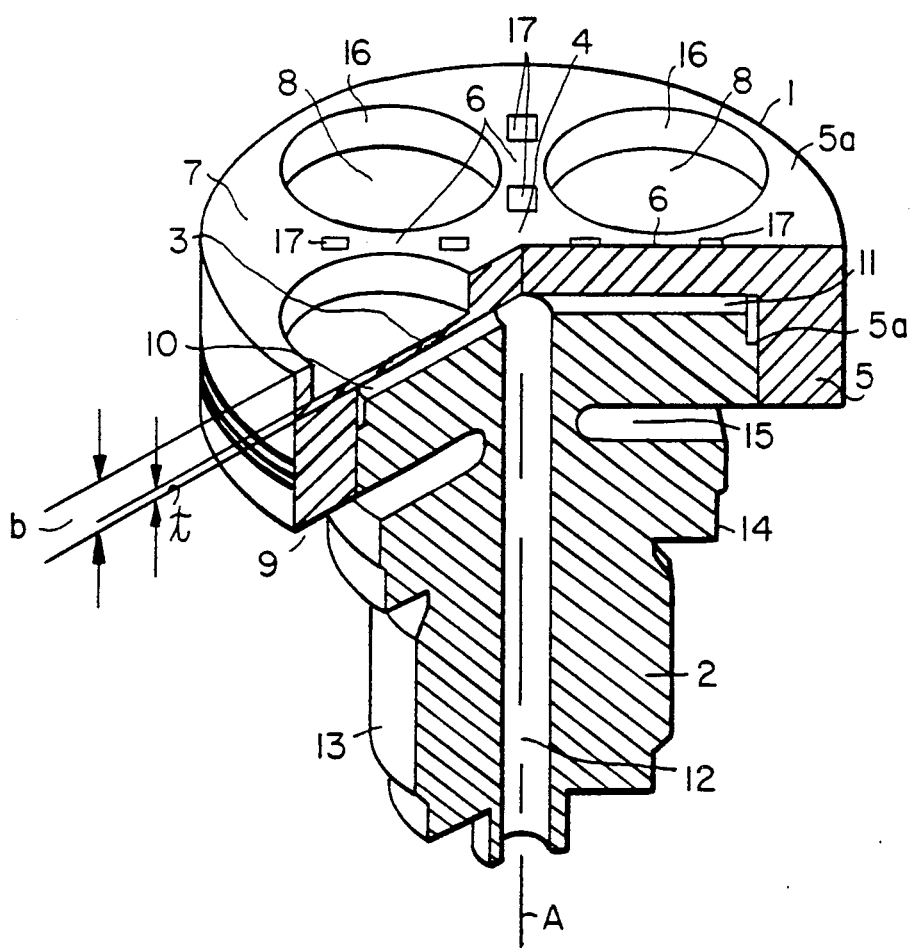
FIG. 1 is a perspective partial sectional view of a pressure sensor according to the invention.

The pressure sensor according to FIG. 1 has a measuring or sensor body 1, which has a pressure-tight connection to a pressure connection body or closure plug 2. Basically, the sensor body 1 has a sensor membrane 3, a thickened inner zone 4, a thickened outer mounting ring 5, and four bending beams 6 arranged on the membrane 3. The bending beams connect the inner zone 4 and the outer ring 5 like spokes. The four bending beams 6 are arranged in a cross-configuration on the membrane 3 and have a cross-section that varies continuously along the radial length of each beam between the inner zone 4 and the outer ring 5, whereby radially inner beam sections near the inner zone 4 and radially outer beam sections near the outer ring 5 have larger cross-sections than the beam central section between these radially inner and outer sections. The just described components form a sensor section of the entire unit, which also includes a closure plug 2 to be described in more detail below.

In the embodiment of FIG. 1, the shape of the bending beams 6 is defined by four cylindrical recesses or dead-end holes 8 in the end face or closure wall 7, the lateral surfaces 16 of two of these holes 8 define the cross-section of each of the bending beams 6. The depth of the recesses 8 determines the beam height b. Instead of cylindrical recesses 8, elliptical, oval, or similarly constructed disk-shaped recesses can be provided to assure the predefined measuring characteristics of the sensor. The shape of the recesses also determines the transition areas of the bending beams 6 to the inner zone 4 and the outer ring 5. The depth b in turn determines in part the thickness of the membranes as will be described in more detail below.

Two strain sensors 17, constructed as foil strain gages, are secured on the plane or end face 7 forming a surface of each bending beam 6, adjacent to the inner zone 4 and to the outer ring 5. These strain gages on the remaining fourth bending beam are not shown because the fourth beam itself is not seen. The strain gages 17 arranged on the four bending beams 6 are connected electrically to a resistance bridge. The plane 7 extends radially and perpendicularly to a central sensor axis A. The plane 7 faces axially outwardly and is therefore conveniently accessible for any required machining operation.

Opposite the end face 7 with the four recesses 8 of the disk-shaped measuring body or section 1, an end face 9 faces axially in the opposite direction into a cylindrical recess 10 whose diameter defines the outer mounting ring 5. The depth of the recess 10 together with the depth of the cylindrical recesses 8, determines the membrane thickness t.

The cylindrical recess 10, or rather the ring 5, has a shoulder 5a onto which the closure plug or pressure connection body 2 is set in the recess or cavity 10. The measuring body 1 and the pressure connection body 2 are joined in the area of the lateral axial surfaces of the recess 10, for example, by welding. Instead of a weld joint, another suitable typical connection is possible, e.g. a threaded connection. A chamber 11 forming a sensor space is defined between the end face of the pressure connection body 2 and the membrane 3. This chamber 11 is connected through a pressure medium channel or duct 12 axially through the pressure connection body 2 to a medium under pressure to be measured.

The pressure connection body or closure plug 2 has a threaded section 13 for fastening it to a support or the like provided with channels carrying the pressure medium and a section 14 for applying torque with a tool, e.g. a wrench. The pressure connection body or plug 2 is provided with a ring groove 15 near the measuring body. The ring groove 15 extends nearly to the pressure medium channel 12 for an effective isolation of the pressure sensing section from the plug 2 to prevent extraneous influences including mounting effects from adversely affecting the measured results.

If the medium in the chamber 11 exhibits a different pressure from the pressure outside the pressure sensor, then membrane 3 and bending beams 6 become deformed relative to the pressure. The measuring sensors or strain gages 17 sense the pressure-dependent deformations and produce measuring signals. The evaluation of the signals provides a value directly representing the pressure to be measured.

The measuring body 1, constructed according to FIG. 1, has the pronounced strain zones of a bending beam and functions simultaneously as a measuring membrane. The membrane strength is so dimensioned that a certain limit strain can be withstood with certainty.

The stressing of the measuring body, especially of the beams 6 and membranes 3, and, consequently, the output signal representing the pressure to be measured, can be influenced by changing the height b of the bending beams, for example, by turning or grinding the plane end face 7, which can be done in very fine steps.

According to the invention, the linearity error of the pressure sensor can be influenced by the available variations for the ratio t/b of the membrane thickness to the axial dimension of the bending beams and/or the shape of the recesses or dead-end holes 8 that define the cross-section of the bending beams. Thus, by taking the geometric dimensions of the measuring body into account, the linearity error can be kept negligibly small.

A ratio of 0.17 of the membrane thickness t to the bending beam height b has proven to be particularly advantageous. The membrane thickness t is preferably between 0.5 and 2.0 mm, depending on the measuring range. The embodiment of FIG. 1 is especially suitable for measuring very large pressures.

Figure 2:
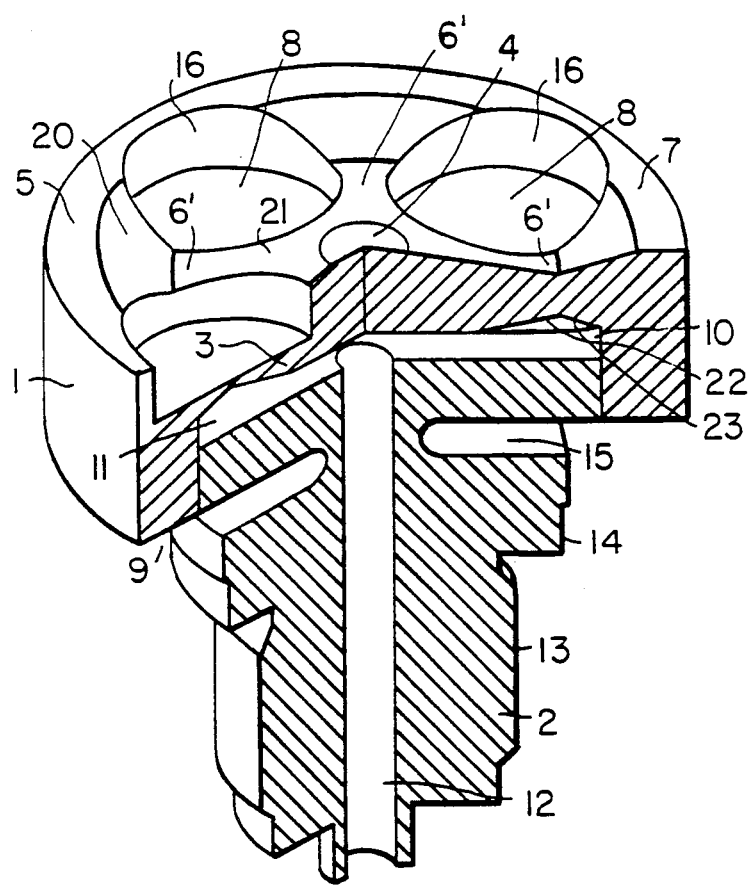
FIG. 2 is a perspective, partial sectional view of a further embodiment of the pressure sensor according to the invention.

FIG. 2 shows another embodiment of a pressure sensor according to the invention for influencing the linearity error. The downwardly facing surfaces 22, 23 and respective upwardly facing surfaces 20 and 21 of the bending beams 6' are constructed as profiled surfaces, not as flat surfaces. The downwardly facing surfaces 22, 23 extend in the down face of the membranes 3 to form a ring groove. The upwardly facing surfaces 20 and 21 extend only in the beams 6'. The foil strain gages arranged on the bending beams 6' are not shown in FIG. 2. The pressure sensor of FIG. 2 has an end ring face 7 which is flat or plane only at the outer ring 5 and then forms the above mentioned surfaces 20 as ring sector surfaces 20 sloping radially inwardly from the outer ring 5. An inner zone 4 has four spokes formed with the radially outwardly sloping surfaces 21. These sloping surfaces 20 and 21 face axially upwardly while two opposite and respectively sloping ring surfaces 22, 23 face axially downwardly. These axially facing surfaces and the side surfaces 16 of the dead-end holes 8 define the bending beams 6' having approximately the shape of two conical frustums connected at their small ends where the smallest cross-section of the respective bending beam 6' is formed. The sloping ring surfaces 22, 23 face into the cylindrical recess 10 formed in the outer ring 5. Both ring surface pairs 20, 21 and 22, 23 are arranged so that they slope toward the center of the respective bending beam 6' approximately halfway between the outer ring 5 and the central zone 4. With the embodiment of FIG. 2, the measuring behavior and the linearity can be adapted particularly well to the specific requirements, since, here, in addition to the arrangement and the shape of the four recesses or dead-end holes 8 and the shape of the cylindrical recess 10, the shape of the ring surfaces 20 to 23 can be used to influence the measuring characteristics.

The neck-like constriction formed by the ring groove 15 also substantially improves the measuring properties and the reproducibility of the measuring results, since it decouples outside influences, such as a mounting torque, just as in FIG. 1. The construction of the joint between the measuring body 1 and pressure connection body 2 as a shear-stressed joint also improves the measuring properties and the reproducibility of the measuring results because, with this type of joint, bending moments can be ignored.

Figure 3:
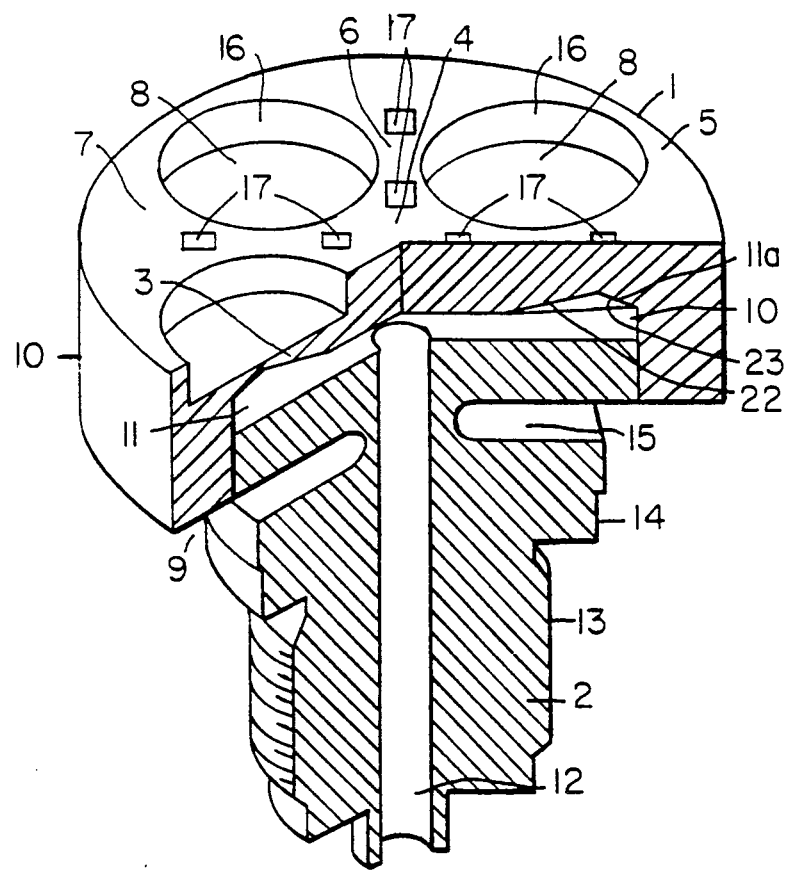
FIG. 3 shows a view similar to that of FIGS. 1 and 2, but illustrating a third embodiment which combines the most advantageous features of the first two embodiments.

FIG. 3 combines the most desirable features of FIGS. 1 and 2 with each other. The smooth surface 7 provides easy accurate mounting of the strain gages 17. The axial depth of the beams 6 is still precisely controllable by the vertical depth of the groove 11a formed by the sloping surfaces 22 and 23. Thus, all the above mentioned advantages are also achieved by FIG. 3.

Figure 4:
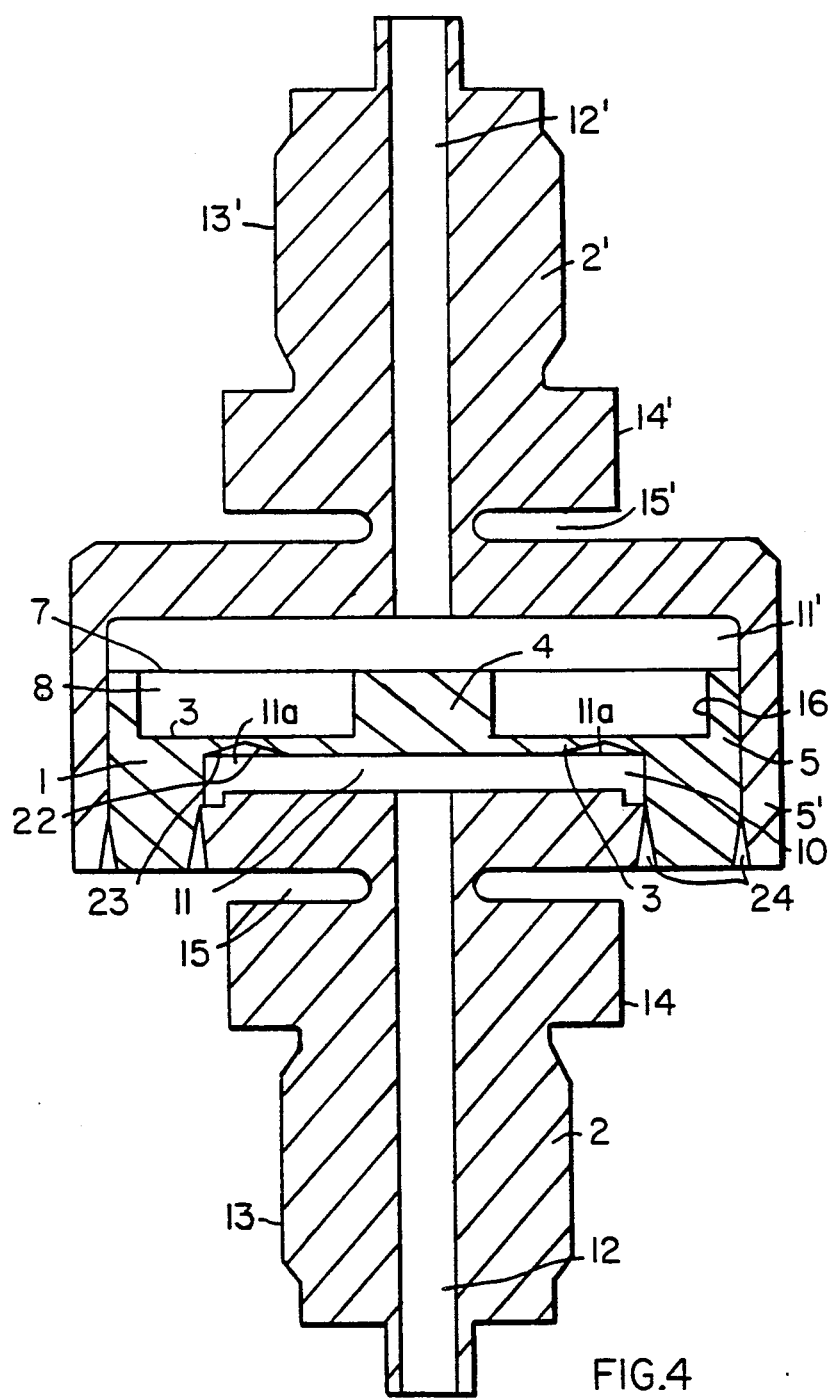
FIG. 4 shows a sectional view through differential pressure sensor according to the invention.

FIG. 4 shows a further embodiment of the invention in which two sensor sections form a twin structure for measuring a pressure difference. One pressurized fluid is admitted into the chamber 11 through the channel 12. Another pressurized fluid is introduced into a chamber 11' through a channel 12' in a pressure connection body 2' having a ring wall 5' surrounding the cavity 11' in which the sensor body 1 of the lower sensor section is received to leave a spacing between the upwardly facing surface 7 of the sensor body 1 and the downwardly facing surface of the pressure connection body 2' thereby providing a flow path through the cavity 11' and through the holes 8 to the upwardly facing flat sensor membranes 3 of the sensor body 1.

The connection body 2' also has a connection threading 13' just as shown at 13 for the lower connection body 2, a torque application section 14' corresponding to section 14 of the lower body 2, and an isolating ring groove 15' corresponding to the same ring groove 15 of the lower body 2.

The sensor body 1 is connected to the ring wall 5' of the upper section and to the plug end 2a of the body 2 through welding seams 24. However, these welding seams may be replaced by respective threaded connections.

The radially inwardly and downwardly sloping ring surface 22 and the radially outwardly and downwardly sloping surface 23 form the same ring groove as shown at 11a in FIG. 3. Therefore, the same controllability is achieved in FIG. 4 as in the other embodiments.

Thus, in FIG. 4 two pressure sensor chambers 11 and 11' are formed and the pressure difference is sensed across the membranes 3 formed by the fluid holes 8 in the sensor body 1. The strain gages in FIG. 4 can be secured to flat horizontal beam surfaces with the above mentioned advantages.

With pressure sensors according to the invention, pressure measurements can be carried out with high absolute accuracy approximately $3 \times 10^{-5}$ with a high reproducibility, good long-term stability, and excellent linearity, so that the pressure sensors according to the invention can be used as calibration references for calibrating other pressure sensors.

So-called pressure balances or scales typically used as calibration references, can be eliminated by using instead the present sensors. With pressure balances, weights are added and pressure is created hydraulically by a piston, whereby the calibration has the disadvantage that there is no electrical output comparison for the pressure sensors to be calibrated, and accuracy is limited to 1 to $3 \times 10^{-4}$.

On the other hand, the pressure sensor according to the invention delivers an electrical output signal which can be compared directly with the pressure sensors to be calibrated. Thus, it is possible for the first time to calibrate a number of pressure sensors simultaneously, whereby only a pressure increasing from 0 to a rated pressure is run through a pressure regulator; this results in substantial savings in cost and time. Although the invention has been described with reference to specific example embodiments it will be appreciated that it is intended to cover all modifications and equivalents within the scope of the appended claims.

What we claim is:

1. A pressure sensing load cell, comprising a mounting ring having a central axis, an end wall closing one end of said mounting ring, said end wall having a plane surface facing in an axially outward direction, a plurality of dead-end holes in said plane surfaced end wall, said dead-end holes opening in said axially outward direction, sensor membrane means formed in said end wall by said dead-end holes, an axial central cavity in said mounting ring, said central cavity opening in a direction opposite said plurality of dead-end holes, substantially radially extending sensor beams formed between neighboring dead-end holes, each sensor beam having a plane axially outwardly facing beam surface extending perpendicularly to said central axis, strain gage means bonded to said axially outwardly facing plane beam surfaces of said sensor beams, each of said sensor beams having two approximately radially sloping surface portions facing said central cavity opposite said plane beam surface, a closure plug for closing said central cavity to form a sensor chamber for receiving fluid under pressure to be measured, and fluid conduit means for admitting fluid under pressure into said sensor chamber, whereby said approximately radially sloping surface portions of each sensor beam face into said sensor chamber.

2. The load cell of claim 1, wherein said closure plug has a central axial bore forming said fluid conduit means for admitting fluid under pressure into said sensor space.

3. The load cell of claim 1, wherein said sloping surface portions of said sensor beams form a groove concentrically around said central axis, said groove facing substantially axially into said sensor space, said groove passing through said sensor beams and through said membrane means for forming a membrane ring section having the smallest membrane thickness.

4. The load cell of claim 3, wherein said groove has a groove diameter which is substantially the same as a diameter of a circle around said central axis and passing through centers of said dead-end holes, whereby said groove has a ridge passing centrally below said membrane means.

5. The load cell of claim 1, wherein said sensor beams have a smallest cross-section which is determined by a diameter of said dead-end holes and by a depth of a groove formed by said sloping surface portions facing said central cavity.

6. The load cell of claim 1, wherein said closure plug comprises a central bore forming said fluid conduit means into said sensor space, first connector means as part of said closure plug for connecting said load cell to a source of pressure through said fluid conduit means in said closure plug, external surfaces on said closure plug for applying a tool to said closure plug, and a ring groove between said external surfaces and a closure plug end secured to said mounting ring, said ring groove having a sufficient depth for isolating said sensor beams from mounting influences.

7. The load cell of claim 6, further comprising second connector means at said closure plug end for securing said closure plug end to said mounting ring in said central cavity.

8. The load cell of claim 1, wherein said bending beams have an axial minimum height b, wherein said membrane means have a minimum axial thickness t, and wherein a ratio of t/b is within the range of ½ to 1/10.

9. The load cell of claim 7, wherein said ratio t/b is 1/6.

10. The use of the load cell of claim 1, as a calibration reference for calibrating pressure sensors.

11. A pressure sensing load cell, comprising a mounting ring having a central axis, an end wall closing one end of said mounting ring, said end wall having a plane surface facing in an axially outward direction, a plurality of dead-end holes in said plane surfaced end wall, said dead-end holes opening in said axially outward direction, sensor membrane means formed in said end wall by said dead-end holes, an axial central cavity in said mounting ring, said central cavity opening in a direction opposite said plurality of dead-end holes, substantially radially extending sensor beams formed between neighboring dead-end holes, each sensor beam having a first plane axially outwardly facing beam surface extending perpendicularly to said central axis, a second plane axially inwardly facing beam surface extending in parallel to said first plane axially outwardly beam surface, strain gage means bonded to said first plane axially outwardly facing beam surfaces of said sensor beams, each of said sensor beams further having two lateral curved surfaces formed by said dead-end holes, a closure plug for closing said central cavity to form a sensor chamber for receiving fluid under pressure to be measured, and fluid conduit means for admitting fluid under pressure into said sensor chamber, whereby said membrane means are exposed to fluid under pressure on a side facing in a direction opposite to said axially outward direction and thus opposite said strain gage means for protecting said strain gage means against said fluid under pressure.

12. The load cell of claim 11, wherein said closure plug has a central axial bore forming said fluid conduit means for admitting fluid under pressure into said sensor space.

13. The load cell of claim 11, wherein said closure plug comprises a central bore forming said fluid conduit means into said sensor space, first connector means as part of said closure plug for connecting said load cell to a source of pressure through said fluid conduit means in said closure plug, external surfaces on said closure plug for applying a tool to said closure plug, and a ring groove between said external surfaces and a closure plug end secured to said mounting ring, said ring groove having a sufficient depth for isolating said sensor beams from mounting influences.

14. The load cell of claim 11, wherein said bending beams have an axial minimum height b, wherein said membrane means have a minimum axial thickness t, and wherein a ratio of t/b is within the range of ½ to 1/10.

15. The load cell of claim 14, wherein said ratio t/b is 1/6.

16. A pressure sensing load cell, comprising a mounting ring having a central axis, an end wall closing one end of said mounting ring, said end wall having an outer rim portion and a central hub portion, both portions facing in an axially outward direction, a plurality of dead-end holes in said end wall, said dead-end holes opening in said axially outward direction, sensor membrane means formed in said end wall by said dead-end holes, an axial central cavity in said mounting ring, said central cavity opening in a direction opposite said plurality of dead-end holes, substantially radially extending sensor beams formed between neighboring dead-end holes, each sensor beam having two sloping axially outwardly facing first beam surfaces and two sloping axially inwardly facing second beam surfaces, strain gage means bonded to said axially outwardly facing slanted first beam surfaces of said sensor beams, said second sloping beam surfaces facing said central cavity, a closure plug for closing said central cavity to form a sensor chamber for receiving fluid under pressure to be measured, and fluid conduit means for admitting fluid under pressure into said sensor chamber.

17. The load cell of claim 16, wherein said closure plug has a central axial bore forming said fluid conduit for admitting fluid under pressure into said sensor chamber.

18. The load cell of claim 16, wherein said sloping axially outwardly facing first beam surfaces of said sensor beams comprise surface pairs (20, 21), each surface pair including a sector-type radially inwardly sloping surface area (20) and a spoke-type radially outwardly sloping surface area (21), and wherein said sloping axially inwardly facing second beam surfaces comprise a radially outwardly sloping ring surface (22) and a radially inwardly sloping ring surface (23) to form a ring groove concentrically around said central axis, said ring groove facing substantially axially into said sensor chamber, said ring groove passing through said sensor beams for restricting the beam cross-sectional area and through said membrane means for forming a membrane ring section having the smallest membrane thickness.

19. The load cell of claim 18, wherein said ring groove has a groove bottom diameter which is substantially the same as a diameter of a circle around said central axis and passing through zones where said surface areas of said surface pairs meet, whereby said ring groove has a ridge passing centrally below said zones.

20. The load cell of claim 19, wherein said sensor beams have a smallest cross-section where said zones are located.

21. A differential pressure sensing load cell, comprising a central sensor body having a mounting ring and a central axis, an end wall closing one end of said mounting ring, said end wall having a surface facing axially in one direction, a plurality of dead-end holes in said end wall, said dead-end holes opening in said one axial direction, sensor membrane means formed in said end wall by said dead-end holes, an axial central cavity in said mounting ring, said central cavity opening in an axial direction opposite said plurality of dead-end holes, substantially radially extending sensor beams formed between neighboring dead-end holes, each sensor beam having a strain gage supporting beam surface, strain gage means bonded to said strain gage supporting beam surface, each of said sensor beams further having at least two approximately radially sloping surface portions facing said central cavity, a first closure member for closing said central cavity forming a first sensor chamber for receiving a first fluid under pressure to be measured, first fluid conduit means for admitting fluid under pressure into said first sensor chamber, a second closure member secured to said sensor body for forming a second sensor chamber facing said dead-end holes for receiving a second fluid under pressure, and second fluid conduit means for admitting fluid under pressure into said second sensor chamber.

22. The load cell of claim 21, wherein said sensor body, said first closure member and said second closure member are axially aligned with each other, and wherein said first and second fluid conduit means are axial bores in said first and second closure members.

23. The load cell of claim 22, wherein said first closure member is a closure plug having a plug portion fitting into said axial central cavity of said mounting ring of said sensor body, wherein said second closure member has a central end chamber, said mounting ring of said sensor body fitting into said central end chamber, and means for securing an outer circumferential wall of said mounting ring to said second closure member and further means for securing said mounting ring to said plug portion of said first closure member.

24. The load cell of claim 21, wherein each of said closure members comprises a respective isolating ring groove for substantially preventing external influences from adversely affecting a measured result.

* * * * *